United States Patent [19]
Akazawa

[11] Patent Number: 5,441,828
[45] Date of Patent: Aug. 15, 1995

[54] ELECTRODE TERMINAL HOLDER FOR BATTERY DRIVE TOOL

[75] Inventor: Shumi Akazawa, Fuchu, Japan

[73] Assignee: Ryobi Limited, Tokyo, Japan

[21] Appl. No.: 251,629

[22] Filed: May 31, 1994

Related U.S. Application Data

[63] Continuation of Ser. No. 11,967, Feb. 1, 1993, abandoned.

Foreign Application Priority Data

Feb. 26, 1992 [JP] Japan ................ 4-008815 U

[51] Int. Cl.$^6$ ............................................. H01M 2/20
[52] U.S. Cl. .................... 429/121; 429/123; 439/540.1; 439/575
[58] Field of Search .............. 429/97, 99, 121, 123; 439/540, 574, 575, 862

[56] References Cited

U.S. PATENT DOCUMENTS

| | | | |
|---|---|---|---|
| 3,993,381 | 11/1976 | Horbach | 439/862 X |
| 4,724,189 | 2/1988 | Chase | 429/99 |
| 4,751,452 | 6/1988 | Kilmer et al. | 429/99 X |
| 4,878,856 | 11/1989 | Maxwell | 439/540 |
| 5,131,872 | 7/1992 | Consoli et al. | 439/862 X |

Primary Examiner—Stephen Kalafut
Attorney, Agent, or Firm—Brooks & Kushman

[57] ABSTRACT

An electrode terminal holder is disclosed for holding two electrode terminals in contact with battery terminals of a power unit and for fixing the electrode terminals to a housing of the power unit. The electrode holder includes a first electrode holding portion and a second electrode holding portion for mounting the electrode terminals onto the first electrode terminal holding portion. The first and second electrode terminal holding portions having engaging portions for integrally coupling the first and second electrode terminal holding portions. The first electrode terminal holding portion has electrode terminal insertion holes provided at their inner surfaces with support walls for the electrode terminals. The the second electrode terminal holding portion has pressure pieces for the electrode terminals against the support walls of the electrode terminal insertion holes when the engaging portions are engaged.

14 Claims, 13 Drawing Sheets

F I G. 12
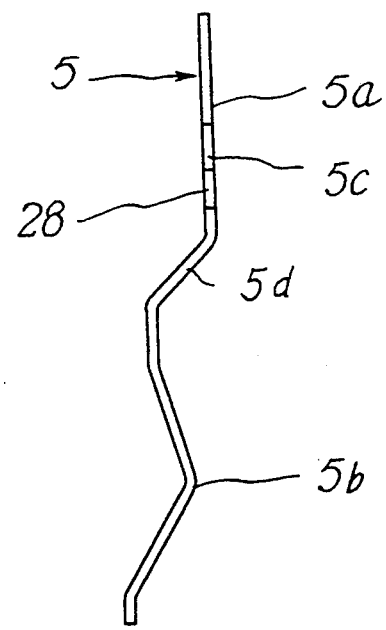
F I G. 13
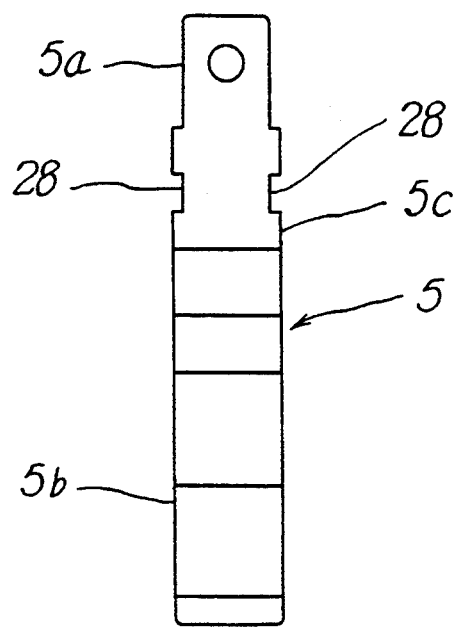

F I G. 19
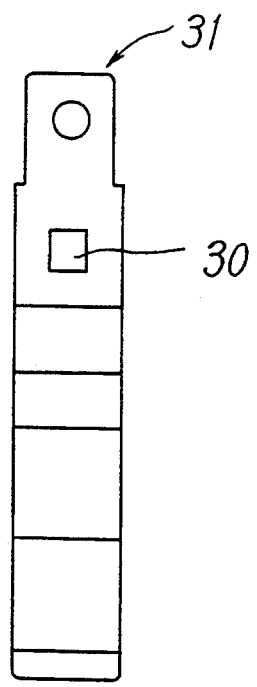

ELECTRODE TERMINAL HOLDER FOR BATTERY DRIVE TOOL

This is a continuation of application Ser. No. 08/011967 filed on Feb. 1, 1993, now abandoned.

BACKGROUND OF THE INVENTION

The present invention relates to an electrode terminal holder for a battery drive tool.

A structure of battery receiving portion of a battery drive tool is shown in, for example, Japanese Utility Model Publication No. Hei 2-48233. More specifically, batteries are detachably loaded in a body of the battery drive tool, and electrode terminals are separatably provided at the terminals of the batteries for outputting power of the batteries to a motor.

Two electrode terminals are mechanically held by the electrode terminal holder and are received in a housing of the battery drive tool. Each electrode terminal is kept in contact with terminals of the batteries.

For example, as shown in FIG. 20, the electrode terminal holder is made of synthetic resin in one piece. More specifically, two electrode terminals 2 and 3 are formed into one piece by a block-shaped synthetic resin molding 1.

However, in the former conventional electrode terminal holder, since guide pieces of the electrode terminals are inserted into grooves formed in a housing and the electrode terminals are fastened in place by pressingly contacting against the bottoms of the grooves through spring-like retainers formed in parts of the guide pieces, there is a fear that the right and left electrode terminals would be asymmetrical due to the difference in elasticity of the retainers. If both the electrode terminals would be assymetrical, the contact between the electrode terminals and the terminals of the battery would not be positive, and there would be many problems such as inconductivity and heat generation.

Also, since the fastening of the electrode terminals relative to the electrode terminal holder is performed by slidingly moving the guide pieces of the electrode terminals along the grooves of the electrode terminal holder, it is difficult to determine the position where the sliding movement of the guide pieces.

In the latter conventional electrode terminal holder, there is a fear that the electrode terminals 2 and 3 mounted within molds would be displaced on the injection molding of synthetic resin, or the electrode terminals 2 and 3, in particular, a bent portion 2a would be assymetric due to a retraction of resin after the molding operation. Thus, this would lead to the same problem as that inherent in the former conventional electrode terminal holder.

SUMMARY OF THE INVENTION

An object of the present invention is to overcome the foregoing defects inherent in the prior art described above.

In order to attain this and other objects, according to the present invention, there is provided an electrode terminal holder for holding two electrode terminals in contact with battery terminals of a power unit and for fixing said electrode terminals to a housing of the power unit, said electrode terminal holder comprising a first electrode holding portion and a second electrode terminal holding portion to be assembled with the first electrode holding portion for mounting said electrode terminals onto the first electrode terminal holding portion, said first and second electrode terminal holding portions having engaging portions for integrally coupling said first and second electrode terminal holding portions, said first electrode terminal holding portion having at least one electrode terminal insertion hole provided, at its inner surface, with a pair of support walls for the electrode terminals, and said second electrode terminal holding portion having a pair of pressure pieces for pressing said electrode terminals against said support walls of said electrode terminal insertion hole when said engaging portions are engaged. According to the invention, it is possible to couple the first and second electrode terminal holding portions together by the engagement of the engaging portions.

Upon this engagement, the pressure pieces of the second electrode terminal holding portion are inserted into the electrode terminal insertion holes of the first electrode terminal holding portion, and at the same time, the respective electrode terminals are pressingly engaged against the support walls of the electrode terminal insertion holes.

For this reason, the two electrode terminals are fixed symmetrically in place without positional offset or deformation from the start to the termination of the assembling of the electrode terminal holder. In the case where the first electrode terminal holding portion is mounted in place within the housing of the power unit, the two electrode terminals and the battery terminals are brought into a stable contact with each other.

In order to facilitate the engagement of the both electrode terminal holding portions, a pair of elastic claims may be provided on the second electrode terminal holding portion.

Further, there may be provided an electrode terminal holder in which by the engagement between the concave and convex portions, the electrode terminals are positioned in place within the electrode terminal insertion holes of the first electrode terminal holding portion.

Accordingly, it is possible to readily perform the assembling of the electrode terminals and to accurately restrict the positional relationship between the electrode terminals.

BRIEF DESCRIPTION OF THE DRAWINGS

In the accompanying drawings:

FIG. 12 is a frontal view showing the electrode terminal;

FIG. 13 is a side elevational view showing the electrode terminal shown in FIG. 12;

FIG. 19 is a side elevational view showing the electrode terminal according to this embodiment.

DESCRIPTION OF THE PREFERRED EMBODIMENTS

The present invention will now be described with reference to the accompanying drawings.

Figure 3:
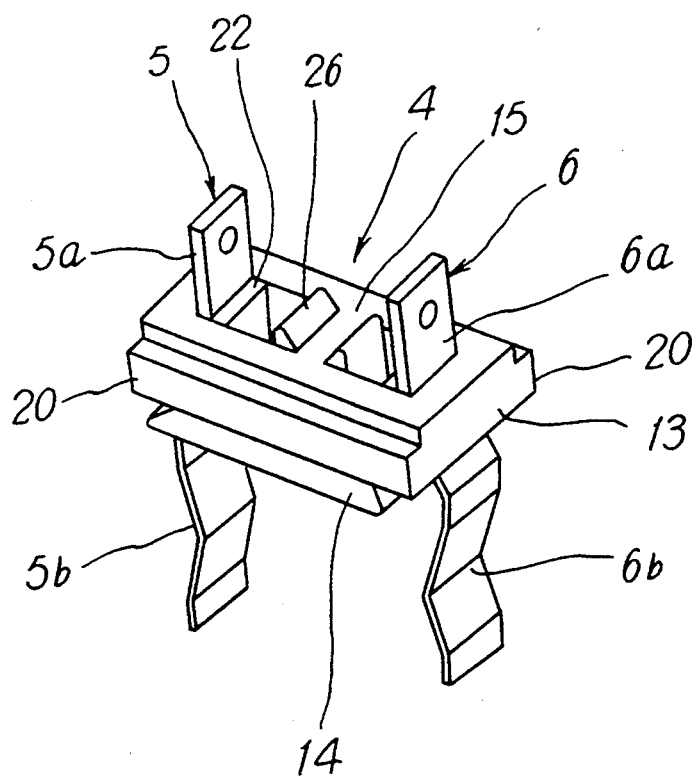
FIG. 3 is a perspective view showing the electrode terminal holder, shown in FIG. 1, which has been assembled.
Figure 4:
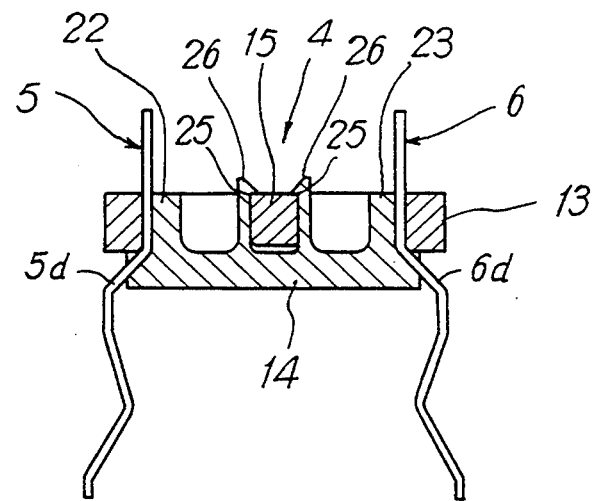
FIG. 4 is a vertical sectional view showing the electrode terminal holder, shown in FIG. 1, which has been assembled.
Figure 5:
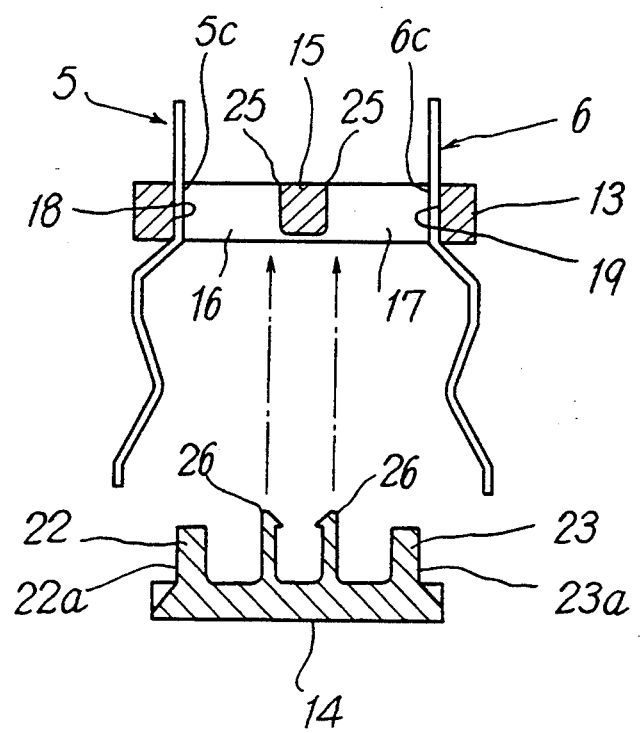
FIG. 5 is a vertical sectional view showing the electrode terminal holder, shown in FIG. 1, which has not been assembled.
Figure 14:
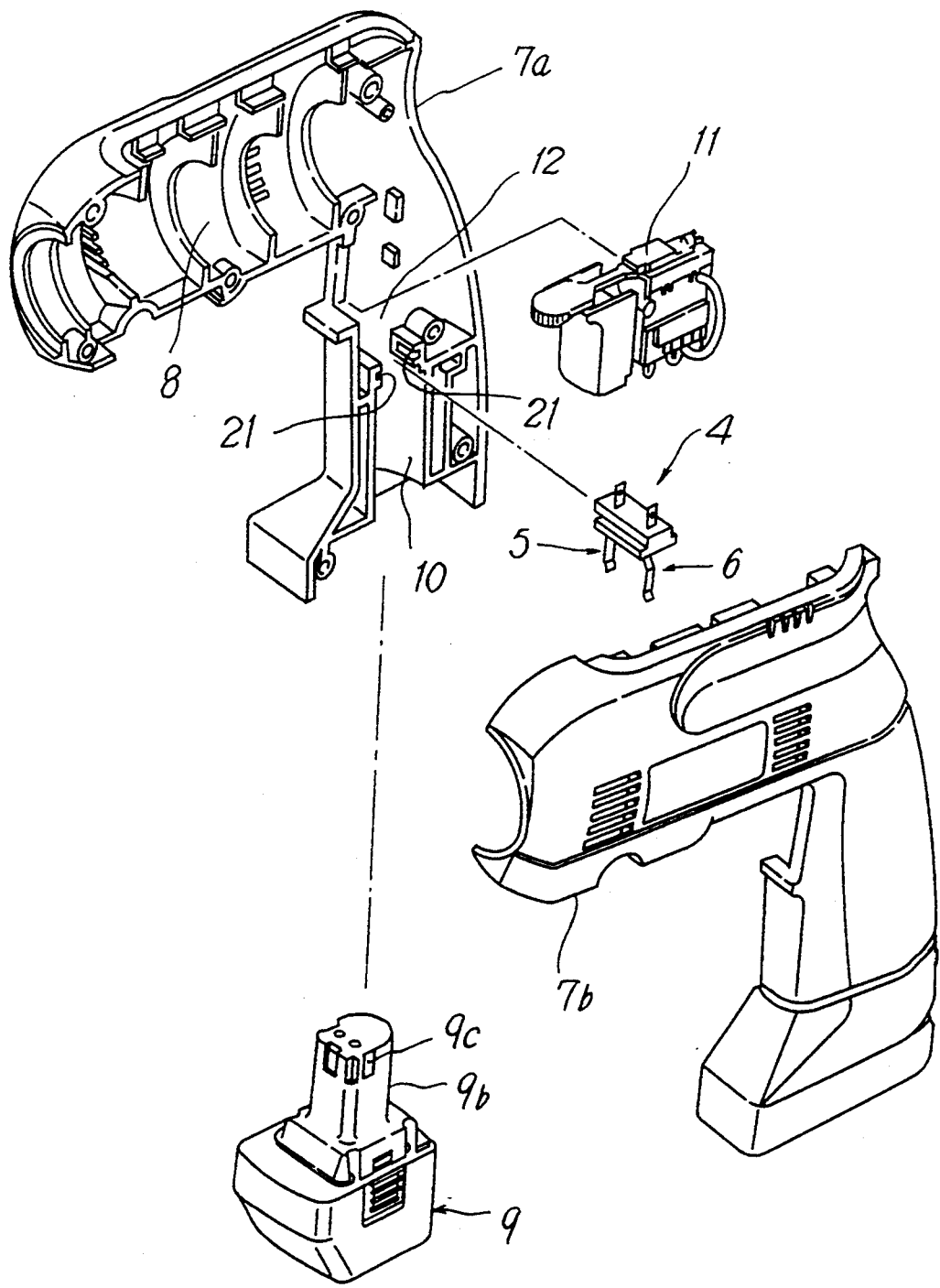
FIG. 14 is a perspective view showing the electrode terminal holder together with a battery unit shown in the foregoing drawings.

As shown in FIGS. 3 through 5, an electrode terminal holder 4 is assembled with a pair of electrode terminals 5 and 6 to form a unit. As best shown in FIG. 14, the unit is mounted within and fixed to housing halves 7a and 7b of a power tool such as a hand drill.

The housing halves 7a and 7b are made of synthetic resin and has an upper receiving chamber 8 for receiving therein a power unit and a drive unit (not shown) for driving a tool, a lower receiving chamber 10 for detachably holding a battery assembly 9, and an intermediate receiving chamber 12 for receiving a switch 11 for turning on/off the power of batteries 9a (see FIG. 1) accommodated in the battery assembly 9 and the electrode terminal holder 4 for connecting the batteries 9a with the switch 11.

Upon assembling the above-described housing halves 7a and 7b, the power unit and the like and the electrode terminal holder 4 are held in the upper receiving chamber 8 and the intermediate receiving chamber 12, respectively, and are fixed in place by fastening means such as screws.

The battery assembly 9 is a discrete unit apart from the housing halves 7a and 7b and is adapted to receive the batteries 9a within a receiving case 9b. The battery assembly 9 is detachably fixed within the inner surfaces 32 of the housing halves 7a and 7b. On the upper end of the batteries 9a is provided with two battery terminals 9c which are exposed to a space defined by the housing halves 7a and 7b and are contactable with the electrode terminals 5 and 6 which are held by the electrode terminal holder 4.

The electrode terminal holder 4 is used to hold the two electrodes 5 and 6 for bringing them into contact with the battery terminals 9c of the power tool as shown in FIGS. 1 through 4, and is adapted to fix the electrode terminals 5 and 6 within the housing halves 7a and 7b of the power tool. The holder 4 has a first electrode terminal holding portion 13 for fixing the electrode terminals 5 and 6 within the housing halves 7a and 7b and a second electrode terminal holding portion 14 for cooperating with the first electrode terminal holding portion 13 to mount the electrode terminals 5 and 6 on the first electrode terminal holding portion 13.

Figure 1:
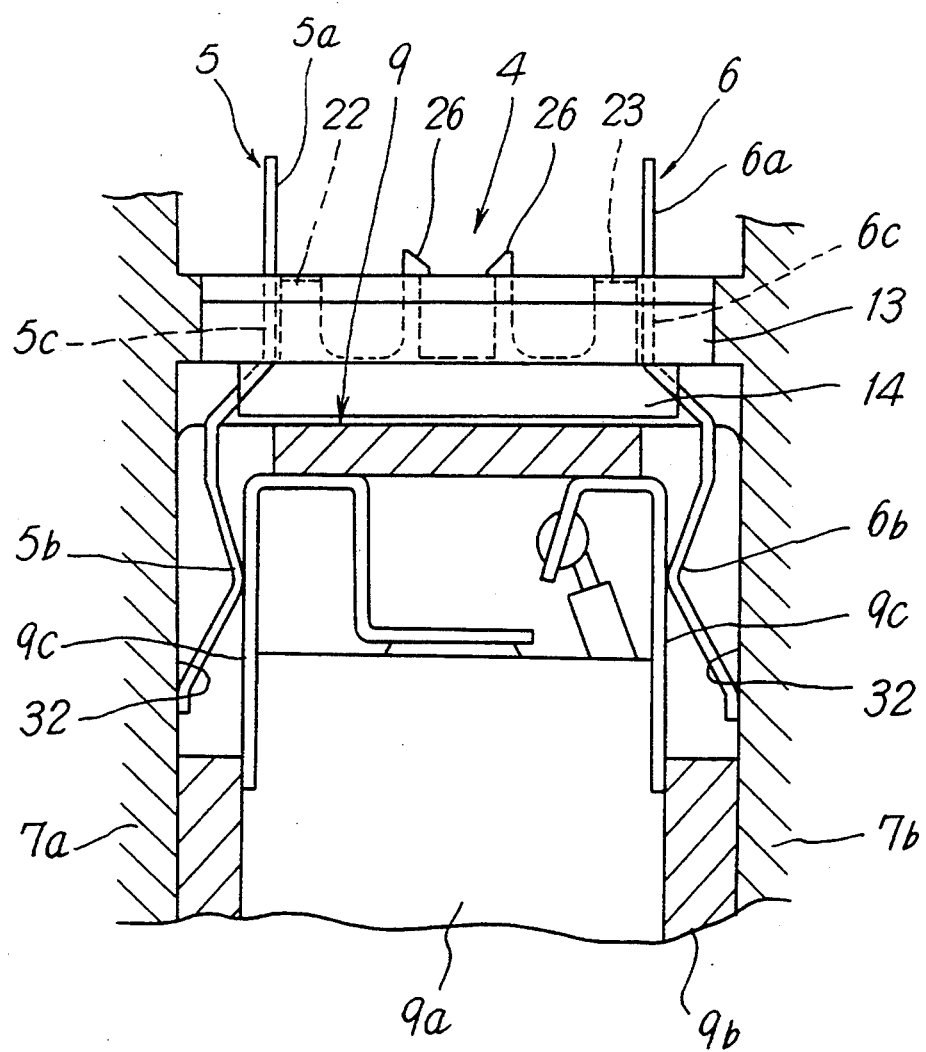
FIG. 1 is a partial cross-sectional view showing an electrode terminal holder according to the present invention together with housing halves of a power tool.

As shown in FIGS. 1, 12 and 13, the electrode terminals 5 and 6 are provided at both ends with contact head portions 5a and 6a to be in contact with the switch 11 and contact leg portions 5b and 6b which are in contact with the battery terminals 9c. Further, the terminals 5 has, at their intermediate portion, clamp portions 5c and 6c between the contact head and leg portions 5a, 6a and 5b, 6b to be clamped by the electrode terminal holder 4.

Figure 6:
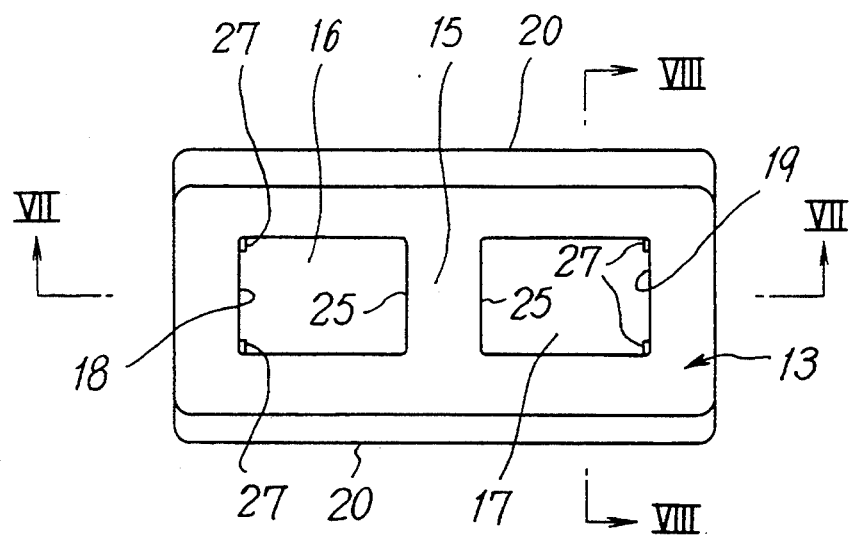
FIG. 6 is a plan view showing the first electrode terminal holding portion shown in FIG. 5.
Figure 7:
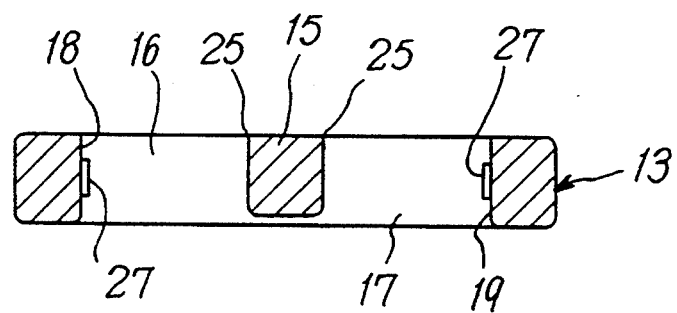
FIG. 7 is a cross-sectional view taken along the line VII—VII of FIG. 6.
Figure 8:
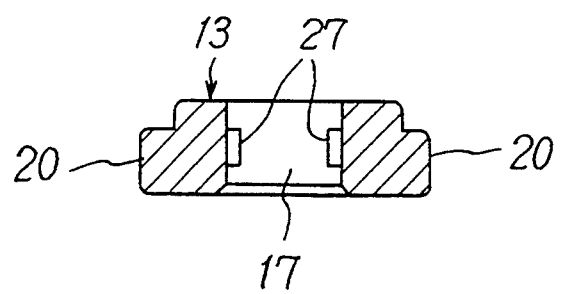
FIG. 8 is a cross-sectional view taken along the line VIII—VIII of FIG. 6.

The first electrode terminal holding portion 13 is substantially in the form of a rectangular shape and made of plate material as shown in FIGS. 6 through 8. The holding portion 13 is provided with electrode terminal insertion holes 16 and 17 which are separated from each other by a central partition wall 15.

Each of the electrode terminal insertion holes 16 and 17 is shaped into a rectangle. The inner wall surfaces of the outside peripheral portions of the holes 16, 17 form two support walls 18 and 19, respectively. The support walls 18 and 19 are smooth surfaces perpendicular to the extending direction of the first electrode terminal holding portion 13 and is contactable with the smooth clamp portions 5c and 6c of the electrode terminals 5 and 6, respectively. A width of each support wall 18, 19 is the same as each clamp portion 5c and 6c of the electrode terminal 5 and 6 for making it easy to position the electrode terminal 5 and 6 in place.

Figure 2:
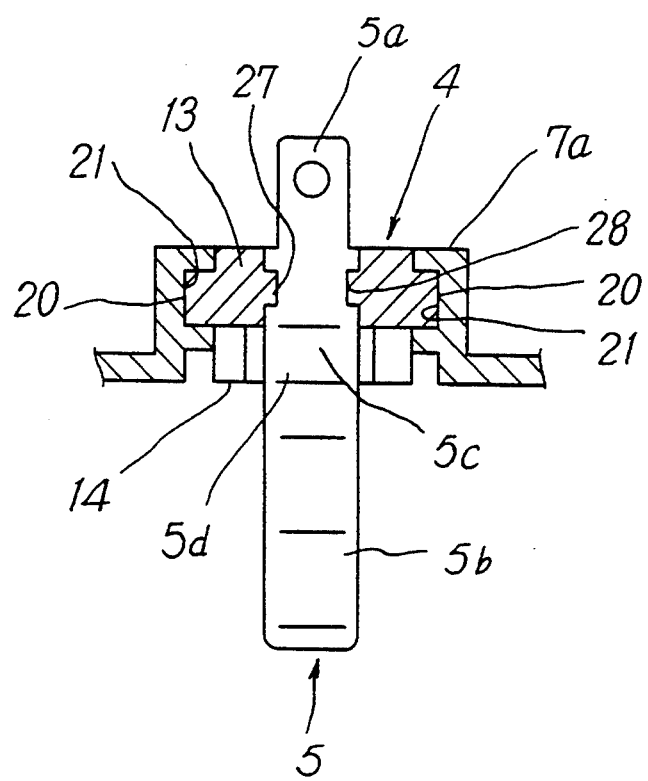
FIG. 2 is a side-elevational, cross-sectional view showing the electrode terminal holder with the housing shown in FIG. 1.

Elongated projections 20 and 20 are formed along the long edges of the first electrode terminal holder 13 and are engageable with associated grooves 21 formed in the housing halves 7a and 7b as best shown in FIGS. 2 and 14.

Figure 9:
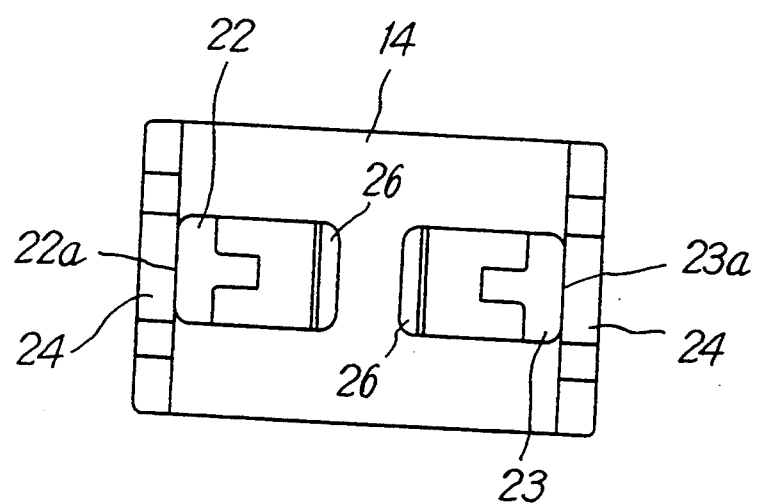
FIG. 9 is a plan view showing the second electrode terminal holding portion shown in FIG. 5.
Figure 10:
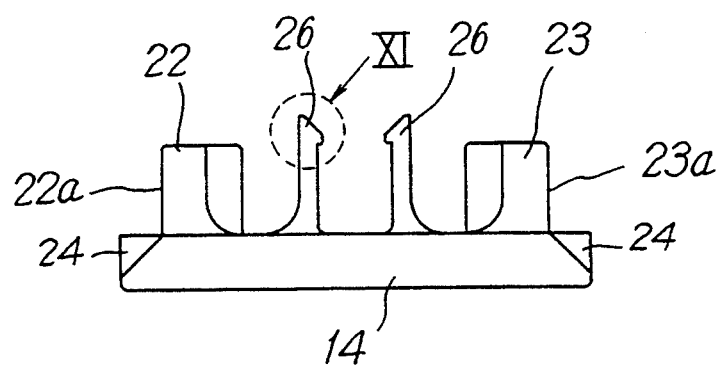
FIG. 10 is a frontal view showing the second electrode terminal holding portion shown in FIG. 5.
Figure 11:
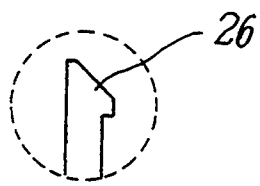
FIG. 11 is an enlargement view showing a part XI of FIG. 10.

As shown in FIGS. 9 through 11, the second electrode terminal holding portion 14 is shaped into a rectangle which is somewhat smaller than that of the first electrode terminal holding portion 13 and made of plate material. The holding portion 14 is provided at positions corresponding to the electrode terminal insertion holes 16 and 17 with pressure pieces 22 and 23 for pressing the respective electrode terminals 5 and 6 against the associated support walls 18 and 19 of the electrode terminal insertion holes 16 and 17 when the holding portion 14 is assembled with the first terminal holding portion 13.

The pressure pieces 22 and 23 have pressure walls 22a and 23a at positions corresponding to the support walls 18 and 19, respectively, to press the electrode terminals 5 and 6.

Slanted surfaces 24 and 24 which are contiguous with the pressure walls 22a and 23a of the presssure pieces 22 and 23 are formed along the short edges of the second electrode holding portion 14. The slanted surfaces 24 and 24 are used to support supplementarily the bent portions 5d and 6d (FIG. 4) of the clamp portions 5c and 6c of the electrode terminals 5 and 6.

The first and second electrode terminal holding portions 13 and 14 have engaging portions for coupling together. As shown in FIGS. 4 through 7, one of the engaging portions is composed of corner receiving portions 25 and 25 on both sides of the partition wall 15 of the first electrode terminal holding portion 13, and as shown in FIGS. 4, 5, 9, 10 and 11, the other is composed of elastic claw pieces 26 projecting from the central portion of the second electrode terminal holding portion 14, which may engage with the corner portions 25 and 25 in an embracing manner.

In the electrode terminal insertion holes 16 and 17 of the first electrode terminal holding portion 13 and the electrode terminals 5 and 6, it is possible to form projecting and recessed portions, which may engage with each other, for facilitating the positioning thereof. For example, as shown in FIGS. 6 through 8, the portions 27 are formed into rectantular projections at the corners of the electrode terminal insertion holes 16 and 17 of the first electrode terminal holding portion 13. Portions 28 are, as shown into FIGS. 12 and 13, formed in rectangular recesses at the side faces of the clamp portions 5c and 6c of the electrode terminals 5 and 6.

Figure 15:
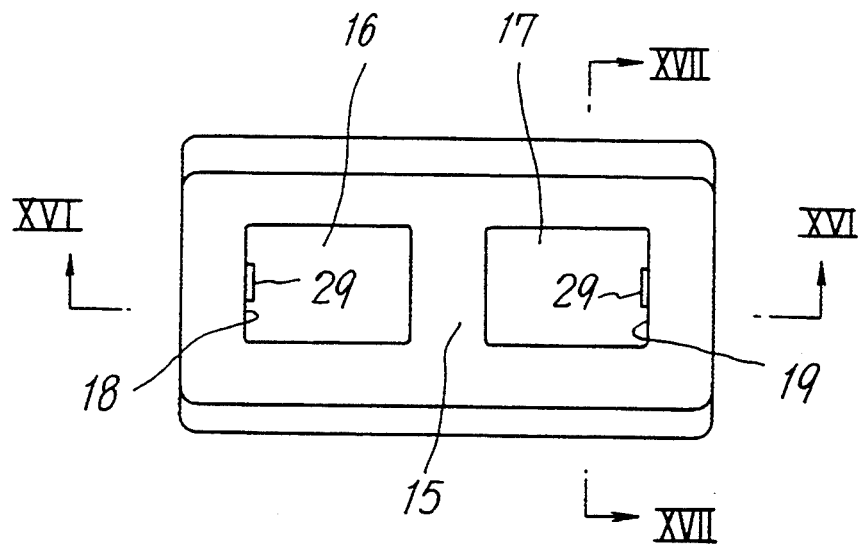
FIG. 15 is a plan view of a first electrode terminal holding portion in accordance with another embodiment.
Figure 16:
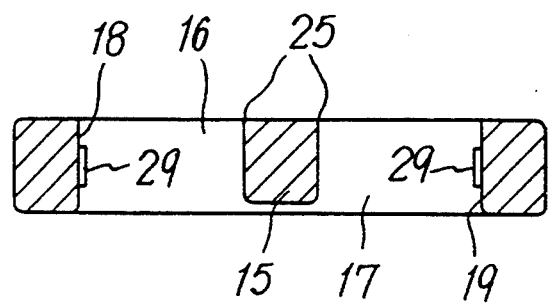
FIG. 16 is a cross-sectional view taking along the line XVI—XVI of FIG. 15.
Figure 17:
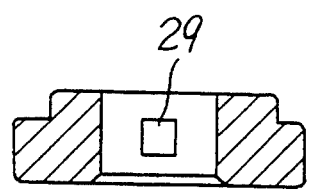
FIG. 17 is a cross-sectional view taking along the line XVII—XVII of FIG. 15.
Figure 18:
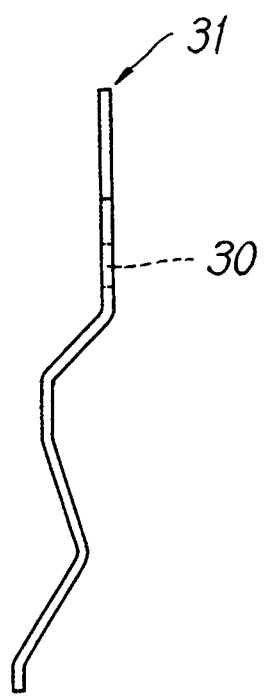
FIG. 18 is a frontal view of the electrode terminal according to this embodiment.
Figure 20:
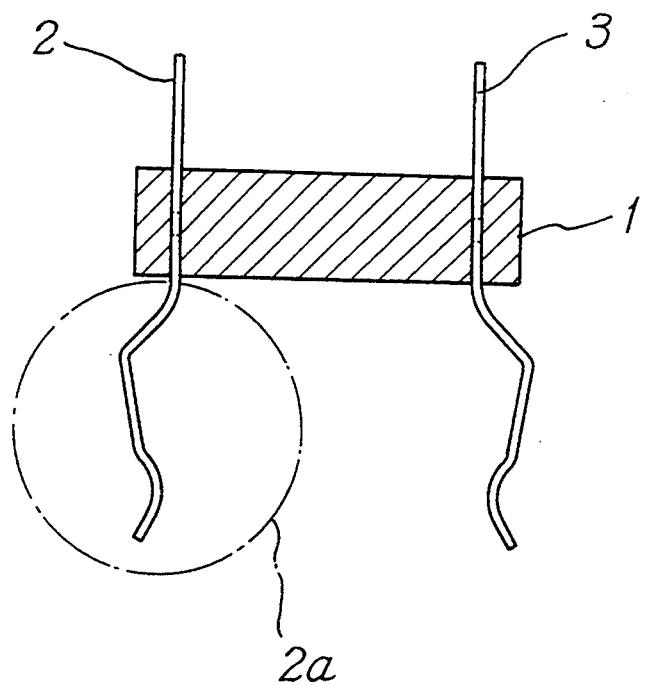
FIG. 20 is a vertical sectional view showing an electrode terminal holder in accordance with prior art.

As shown in FIGS. 15 and 17, portions 29 are formed into rectangular projections in the middle of the support walls 18 and 19, and portions 30 are formed into rectangular recesses in the middle of the clamp portions of the electrode terminals 31. Also, rectangular recesses such as 27 and 29 may be formed on the electrode terminals 5, 6 and 31 and rectangular recesses such as 28 and 30 may be formed in the electrode terminal insertion holes 18 and 19.

The assembling and mounting method of the electrode terminals into the housing of the power tool will be explained.

As shown in FIG. 5, the respective electrode terminals 5 and 6 are inserted into the associated electrode terminal insertion holes 16 and 17 of the first electrode terminal holding portion 13 with the clamp portions 5c and 6c of the respective electrode terminals 5 and 6 in contact with the support walls 18 and 19.

In this case, it is possible to readily and accurately perform the positioning of the electrode terminals 5 and 6 by engaging the rectangular recesses 27 and the rectangular projections 28 with each other.

Subsequently, the electrode terminal holding portion 14 is applied to the first electrode terminal holding portion 13 from below. The two claw pieces 26 abut against the lower portion of the partition wall 15 to be deformed. The claw pieces 26 are slidingly moved along both side wall surfaces of the partition wall 15 and are resiliently engaged with the corner portions 25 of the partition wall 15. Thus, as shown in FIGS. 3 and 4, the first and second electrode terminal holding portions 13 and 14 are engaged with each other through a one-touch operation.

Upon the engagement of the engaging portions of the corner portions 25 and claw pieces 26, the pressure pieces 22 and 23 are inserted into the respective electrode terminal insertion holes 16 and 17, so that the respective electrode terminals 5 and 6 are pressed against the associated support walls 18 and 19 within the electrode terminal insertion holes 16 and 17 of the first electrode terminal holding portion 13. The two electrode terminals 5 and 6 are fixed symmetrically in place within the electrode terminal holder 4 by the clamping action between the pressure pieces 22 and 23 and the support walls 18 and 19.

Subsequently, upon the assembling of the housing halves 7a and 7b of the power tool, as shown in FIGS. 1, 2 and 14, the elongated projections 20 of the first electrode terminal holding portion 13 are inserted into the grooves 21 of the housing halves 7a and 7b. The electrode terminals 5 and 6 are held stationary in place within the housing halves 7a and 7b by the engagement between the projections 20 and grooves 21. The contact portions 5b and 5b which are contactable with the battery terminals 9c of the electrode terminals 5 and 6 are brought into contact with inner walls 32 of the housing halves 7a and 7b.

When the battery assembly 9 is inserted into the housing halves 7a and 7b from below, the battery terminals 9c are brought into contact with the contact portions 5b and 6b of the electrodes terminals 5 and 6. The contact portions 5b and 6b of the electrode 5 and 6 are resiliently deformed to come into contact with the battery terminals 9c at a high pressure.

Also, since the right and left electrode terminals 5 and 6 are clamped between the pressure walls 22a and 23a and the support walls 18 and 19, the electrode terminals 5 and 6 are held simmetrically within the housing halves 7a and 7b and are held stationary in contact with the battery terminals 9c in a stable manner.

According to a first aspect of the invention, it is possible to keep the right and left electrode terminals in a symmetrically manner. Accordingly, a stable contact pressure may be obtained between the electrode terminals and the battery terminals to thereby ensure the contact between two pairs of electrode terminals and battery terminals.

According to a second aspect of the invention, it is possible to rapidly and accurately perform the positioning of the terminal electrodes within the electrode terminal insertion holes. Accordingly, it is possible to facilitate the assembling operation of the electrode terminals and to accurately restrict the positional relation of the electrode terminals.

What is claimed is:

1. An electrode terminal holder for holding two electrode terminals in contact with battery terminals of a power unit and for fixing said electrode terminals to a housing of the power unit, said electrode holder comprising:

a first electrode terminal holding portion and a second electrode terminal holding portion, said first electrode terminal holding portion having at least one electrode terminal insertion hole provided, at its inner surface, with a pair of support walls and said second electrode terminal holding portion having a pair of pressure pieces;

an electrode terminal holder wherein said second electrode terminal holding portion has a pair of slanted surfaces, provided at positions corresponding to the support walls, for receiving two bent portions of the electrode terminals for supplementarily supporting them, each slanted surface defining a position of one electrode terminal along its longitudinal direction;

said first and second electrode terminal holding portions having engaging portions for integrally coupling said first and second electrode terminal holding portions; and wherein the two electrode terminals are disposed on opposite support walls from each other, said first electrode terminal holding portion is assembled with said second electrode terminal holding portion in such a manner that each of the pressure pieces presses one electrode terminal against one support wall, and, at the same time, said engaging portions are engaged to hold said first electrode terminal holding portion, said second electrode terminal holding portion, and the pair of electrode terminals to form integrally one part.

2. An electrode terminal holder according to claim 1, wherein said engaging portions further comprise at least one elastic claw formed on the second electrode terminal holding portion and a receiving portion formed on the first electrode terminal holding portion for receiving the elastic claw of the second electrode terminal holding portion.

3. An electrode terminal holder according to claim 8, wherein said first electrode terminal holding portion has a pair of electrode terminal insertion holes with a partition wall provided therebetween and a pair of support walls provided at their respective outside peripheral portions, a pair of claw pieces being engaged with the two corner portions of the partition wall.

4. An electrode terminal holder according to claim 1 wherein the housing of the power unit has a pair of grooves, and wherein:
   said first electrode terminal holding portion has an elongated projection along each of two of its opposite sides, and
   the housing of the power unit has defined therein a pair of grooves to receive the elongated projections of said first electrode terminal holding portion within the housing of the power unit.

5. An electrode terminal holder for holding two electrode terminals in contact with battery terminals of a power unit and for fixing said electrode terminals to a housing of the power unit, said electrode holder comprising:
   a first electrode terminal holding portion and a second electrode terminal holding portion, said first electrode terminal holding portion having at least one electrode terminal insertion hole provided, at its inner surface, with a pair of support walls and said second electrode terminal holding portion having a pair of pressure pieces;
   said first and second electrode terminal holding portions having engaging portions for integrally coupling said first and second electrode terminal holding portions;
   each of the electrode terminals defines at least one rectangular recess therein;
   said first electrode terminal holding portion defines a rectangular projection, extending laterally into the at least one electrode terminal insertion hole, to engage each of the at least one rectangular recesses in each of the electrode terminals; and
   wherein the two electrode terminals are disposed on opposite support walls from each other, said first electrode terminal holding portion is assembled with said second electrode terminal holding portion in such a manner that each of the pressure pieces presses one electrode terminal against one support wall, and, at the same time, said engaging portions are engaged to hold said first electrode terminal holding portion, said second electrode terminal holding portion, and the pair of electrode terminals to form integrally one part.

6. An electrode terminal holder according to claim 5, wherein said engaging portions further comprise at least one elastic claw formed on the second electrode terminal holding portion and a receiving portion formed on the first electrode terminal holding portion for receiving the elastic claw of the second electrode terminal holding portion.

7. An electrode terminal holder according to claim 5, wherein said first electrode terminal holding portion has a pair of electrode terminal insertion holes with a partition wall provided therebetween and a pair of support walls provided at their respective outside peripheral portions, a pair of claw pieces being engaged with the two corner portions of the partition wall.

8. An electrode terminal holder according to claim 5 wherein the housing of the power unit has a pair of grooves, and wherein:
   said first electrode terminal holding portion has an elongated projection along each of two of its opposite sides, and
   the housing of the power unit has defined therein a pair of grooves to receive the elongated projections of said first electrode terminal holding portion within the housing of the power unit.

9. An electrode terminal holder for holding two electrode terminals in contact with battery terminals of a power unit and for fixing said electrode terminals to a housing of the power unit, said electrode holder comprising:
   a first electrode terminal holding portion and a second electrode terminal holding portion, said first electrode terminal holding portion having at least one electrode terminal insertion hole provided, at its inner surface, with a pair of support walls and said second electrode terminal holding portion having a pair of pressure pieces;
   the electrode terminal insertion hole having the same width as the electrode terminal;
   said first and second electrode terminal holding portions having engaging portions for integrally coupling said first and second electrode terminal holding portions; and
   wherein the two electrode terminals are disposed on opposite support walls from each other, said first electrode terminal holding portion is assembled with said second electrode terminal holding portion in such a manner that each of the pressure pieces presses one electrode terminal against one support wall, and, at the same time, said engaging portions are engaged to hold said first electrode terminal holding portion, said second electrode terminal holding portion, and the pair of electrode terminals to form integrally one part.

10. An electrode terminal holder according to claim 9, wherein said engaging portions further comprise at least one elastic claw formed on the second electrode terminal holding portion and a receiving portion formed on the first electrode terminal holding portion for receiving the elastic claw of the second electrode terminal holding portion.

11. An electrode terminal holder according to claim 9, wherein said first electrode terminal holding portion has a pair of electrode terminal insertion holes with a partition wall provided therebetween and a pair of support walls provided at their respective outside peripheral portions, a pair of claw pieces being engaged with the two corner portions of the partition wall.

12. An electrode terminal holder according to claim 9 wherein the housing of the power unit has a pair of grooves, and wherein:
   said first electrode terminal holding portion has an elongated projection along each of two of its opposite sides, and
   the housing of the power unit has defined therein a pair of grooves to receive the elongated projections of said first electrode terminal holding portion within the housing of the power unit.

13. An electrode terminal holder according to claim 12, wherein:

each of the electrode terminals defines at least one rectangular recess therein; and said first electrode terminal holding portion defines a rectangular projection, extending laterally into the at least one electrode terminal insertion hole, to engage each of the at least one rectangular recesses in each of the electrode terminals.

14. An electrode terminal holder according to claim 13, wherein the electrode terminal insertion hole has the same width as the electrode terminal.

* * * * *